R. R. POWERS.
NUT LOCK.
APPLICATION FILED FEB. 27, 1914.
1,134,006.
Patented Mar. 30, 1915.
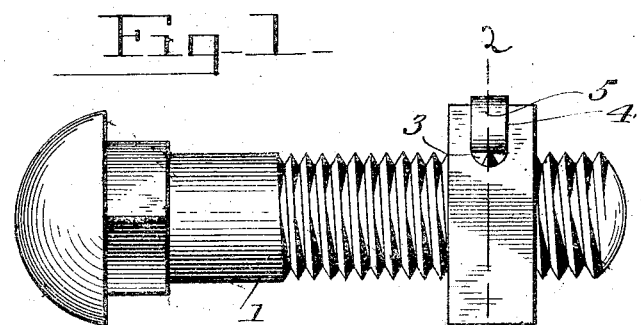
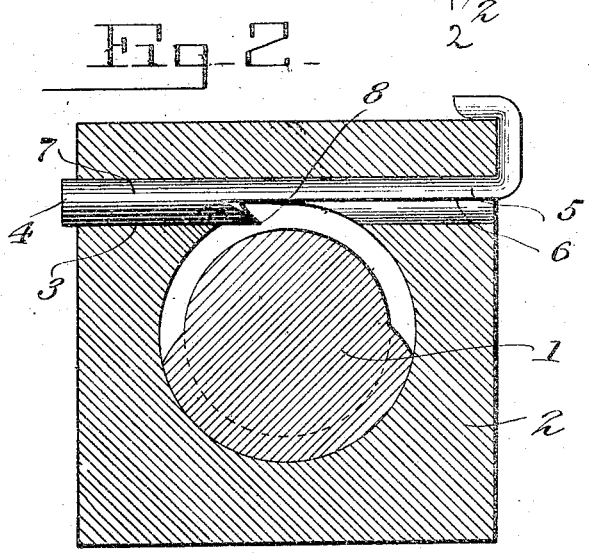
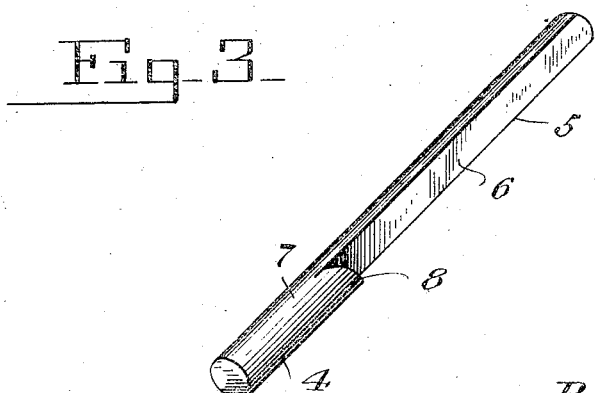
Inventor
Robert R. Powers.
Witnesses
R. D. Spaulding
By Victor J. Evans
Attorney

UNITED STATES PATENT OFFICE.

ROBERT R. POWERS, OF OVERBROOK, OKLAHOMA.

NUT-LOCK.

1,134,006.

Specification of Letters Patent.

Patented Mar. 30, 1915.

Application filed February 27, 1914. Serial No. 821,616.

*To all whom it may concern:*

Be it known that I, ROBERT R. POWERS, a citizen of the United States, residing at Overbrook, in the county of Love and State of Oklahoma, have invented new and useful Improvements in Nut-Locks, of which the following is a specification.

The present invention relates to means for locking a nut upon a bolt which shall be removable from the nut and bolt to permit of the separation of the nut and bolt when desired, and the improvement resides in the construction, combination and arrangement of parts set forth in the following specification and falling within the scope of the appended claim.

In the drawing: Figure 1 is a side view of a nut and bolt locked in accordance with my invention, Fig. 2 is a greatly enlarged sectional view on the line 2—2 of Fig. 1, and Fig. 3 is an enlarged perspective view of the locking member or key.

Referring now to the drawing in detail, the numeral 1 designates a bolt, and 2 a nut which is threaded upon the shank thereof. The nut 2 is provided with a preferably rounded opening 3 which is arranged transverse of its bore and which communicates with the said bore. The opening 3 cuts or intersects two of the threads in the bore of the nut, so that one of the threads of the bolt will be arranged between the said cut threads of the nut, or central of the opening 3.

The numeral 4 designates the locking member or key. This member 4 has its main or body portion rounded in cross section, corresponding to the shape and to the area of the opening 3, and the body is formed of some hardened metal such as spring steel. The key is provided with a reduced extension or tongue 5, the outer face of the same corresponding with the rounded cross sectional contour of the body, but the inner face of which is flat, as indicated by the numeral 6, and the extension or tongue may be formed of some material which is ductile under a hammer or which may be otherwise easily bent. The body 7 of the key 4, at its juncture with the tongue 5, is cut or beveled inwardly toward the flat face 6 of the tongue to provide the same with a sharpened entering member or tooth 8, and, by reference to Fig. 2 of the drawing, it will be noted that the opening 3 is so arranged as to permit of the tongue 5 of the key 4 engaging with what I will term the outer wall of the opening and passing through the said opening without contacting with the bolt 1 or without entering the bore of the nut. The sharpened or entering member 8, however, is so arranged upon the body 7 of the key as to be directly within the path of the thread of the bolt arranged intermediate of the two cut threads provided by the opening 3, and it will be apparent that a blow delivered upon the outer end of the body 4 will cause the substantially V-shaped entering member to split one of the threads of the bolt transversely and force the portion of the thread tightly into contact with the flat face of the tongue 5. When the key thus engages the threads of the bolt the incision in the threads will be substantially V-shaped, overlying the angular sharpened member 8, and as stated, are also tightly forced against the flat face 6 of the tongue 5. Should an attempt be made to rotate the nut in one direction the portion thereof binding against the flat face 6 will draw the key longitudinally in an inward direction through the opening 3, such movement, however, being extremely limited, as the binding effect between the nut and key will permit only of a slight movement in this direction. Should an attempt be made to rotate the nut in an opposite direction, the angular incisions or ends of the threads produced by the sharpened member 8 of the key will have a tendency to force the said end of the key downward or within the bore of the nut. After the key has been brought into engagement with the bolt, as just described, the end of the tongue 5 extending through the opening 3 may be bent over the nut as illustrated in Fig. 2 of the drawing.

To remove the nut from the bolt it is merely necessary to straighten the bent end of the tongue, and by a slight but suitable impact of force upon the ends of said tongue, the entering member or V-shaped tooth 8 of the key will be forced out of engagement with the thread of the bolt, and the key readily withdrawn from the opening 3. It will further be apparent that no material damage is imparted to the threaded shank of the bolt, as the split portion thereof will readily spring into proper position when the nut is rotated upon the bolt under the influence of a wrench.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

In combination, a bolt, a nut threaded thereon, said nut having an opening arranged adjacent the periphery of the bore thereof, a locking key including a cylindrical rigid body portion and a reduced bendable tongue semi-circular in cross section, the body at its juncture with the tongue being slotted inwardly on an angle so as to form a wedge-shaped tooth, the key adapted to be inserted through the opening so that the tooth can be forced into one of the threads of said bolt, the free end of the body portion projecting beyond one face of the nut, the free end of the tongue portion being bent over one edge of the wall of the opening so as to be parallel with two faces of the nut.

In testimony whereof I affix my signature in presence of two witnesses.

ROBERT R. POWERS.

Witnesses:
T. C. GRAHAM,
E. A. GILDER.

Copies of this patent may be obtained for five cents each, by addressing the "Commissioner of Patents, Washington, D. C."